(12) United States Patent
Dekker et al.

(10) Patent No.: US 12,352,564 B2
(45) Date of Patent: Jul. 8, 2025

(54) ULTRASONIC DEVICE AND METHOD

(71) Applicant: BWXT Canada Ltd., Cambridge (CA)

(72) Inventors: Robert Andrew Dekker, Cambridge (CA); Robert Jeffrey Martin, Cambridge (CA); Mitchel Lucas West, Cambridge (CA)

(73) Assignee: BWXT Canada Ltd., Cambridge (CA)

( * ) Notice: Subject to any disclaimer, the term of this patent is extended or adjusted under 35 U.S.C. 154(b) by 277 days.

(21) Appl. No.: 17/970,848

(22) Filed: Oct. 21, 2022

(65) Prior Publication Data

US 2023/0131625 A1  Apr. 27, 2023

Related U.S. Application Data

(60) Provisional application No. 63/270,286, filed on Oct. 21, 2021.

(51) Int. Cl.
*G01B 17/02* (2006.01)

(52) U.S. Cl.
CPC .................... *G01B 17/02* (2013.01)

(58) Field of Classification Search
USPC .......................................................... 73/661
See application file for complete search history.

(56) References Cited

U.S. PATENT DOCUMENTS

| | | | | |
|---|---|---|---|---|
| 9,575,034 | B2 * | 2/2017 | Rasselkorde | G01N 29/265 |
| 10,261,053 | B2 * | 4/2019 | Ten Grotenhuis | G01N 29/043 |
| 2005/0056105 | A1 | 3/2005 | Delacroix et al. | |
| 2022/0412921 | A1 * | 12/2022 | Jack | G01N 29/225 |

FOREIGN PATENT DOCUMENTS

| | | | | |
|---|---|---|---|---|
| CA | 2666334 | C * | 5/2012 | A61B 18/02 |
| CA | 2831812 | A1 * | 10/2012 | G01B 17/02 |
| CA | 3164543 | A1 * | 7/2021 | A61B 5/0095 |
| EP | 3108236 | B1 | 12/2019 | |

OTHER PUBLICATIONS

Simmons, R. et al., "Replacement of Radiography with Ultrasonic Phased Array for Feeder Tubes in CANDU Reactors using ASME Code Case N-659-2," Publication: 4th International CANDU In-service Inspection Workshop and NDT in Canada 2012, 6 pages.
Voyageur, "New AECL technology reaches private sector implementation," vol. 9 Issue 2, Feb. 2014, 8 pages.
International Search Report and Written Opinion, PCT/IB2022/000640, dated Apr. 11, 2023, 9 pages.

* cited by examiner

*Primary Examiner* — Clayton E. LaBalle
*Assistant Examiner* — Warren K Fenwick
(74) *Attorney, Agent, or Firm* — Nelson Mullins Riley & Scarborough LLP

(57) ABSTRACT

An ultrasonic device for scanning an object, the device having a collar configured for coupling to the object, the collar having an arcuate segment, a carriage coupled to the collar, the carriage configured for displacement along the arcuate segment, a ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object, and a position locator coupled to the carriage, the position locator configured to record a position of the ultrasonic probe unit.

20 Claims, 7 Drawing Sheets

ULTRASONIC DEVICE AND METHOD

CLAIM OF PRIORITY

This application claims priority to U.S. provisional patent application No. 63/270,286 filed Oct. 21, 2021, the disclosure of which is incorporated by reference herein.

TECHNICAL FIELD

The present disclosure relates generally to ultrasonic devices and, more particularly, to ultrasonic devices for measuring a wall thickness of an object.

BACKGROUND

Feeder pipes used in nuclear reactors, such as Canada Deuterium Uranium (CANDU) reactors, form part of the heat transportation system for preventing reactor overheating, melting, and other negative events. Flow accelerated corrosion degrades the strength and integrity of the feeder pipes, resulting in thinner walls, cracking, and other deteriorated conditions. Feeder-hub welds for connecting feeder pipes to hubs, such as Grayloc™ hubs, are particularly susceptible to flow accelerated corrosion. Consequently, regularly inspecting the mechanical fitness of feeder pipes, particularly wall thickness at feeder-hub weld locations, is required.

Manual inspection may employ ultrasonic pencil probes to detect a feeder-hub wall thickness, but are prone to operator errors. Complex topography on feeder-hub weld surfaces provides challenges in manually placing pencil probes to take accurate measurements. Environmental obstacles, such as adjacent feeder pipes, limit physical space in-and-around the inspection location, and may further inhibit placing and orienting a probe at an inspection location. Inspectors further lack manual precision to take accurate wall-thickness measurements, due to inhibited dexterity from wearing several layers of radiation protective equipment, including thick gloves. Exposure to radiation during inspection also necessitates the need for quick inspection. It remains desirable to develop further improvements and advancements in ultrasonic inspection, to overcome shortcomings of known techniques, and to provide additional advantages.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

SUMMARY OF INVENTION

One embodiment of the present disclosure provides an ultrasonic device for scanning an object, the device having a collar configured for coupling to the object, the collar having an arcuate segment, a carriage coupled to the collar, the carriage configured for displacement along the arcuate segment, an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object, and a position locator coupled to the carriage, the position locator configured to record a position of the ultrasonic probe unit.

Another embodiment of the present disclosure provides an ultrasonic device for scanning an object, the device having a collar configured for coupling to the object, the collar having an arcuate segment, a carriage coupled to the collar, the carriage configured for displacement along the arcuate segment, an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object, a position locator coupled to the carriage, the position locator configured to record a position of the ultrasonic probe unit, and wherein the arcuate segment spans between about 180 degrees and less than about 220 degrees, of a circumference of the collar.

Another embodiment of the present disclosure provides an ultrasonic device for scanning an object, the device having a collar configured for coupling to the object, the collar having an arcuate segment, a carriage coupled to the collar, the carriage configured for displacement along the arcuate segment, an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object, a position locator coupled to the carriage, the position locator configured to record a position of the ultrasonic probe unit, and wherein the collar further comprises a plurality of resiliently compressible elements for providing conforming contact between the collar and the object.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1:
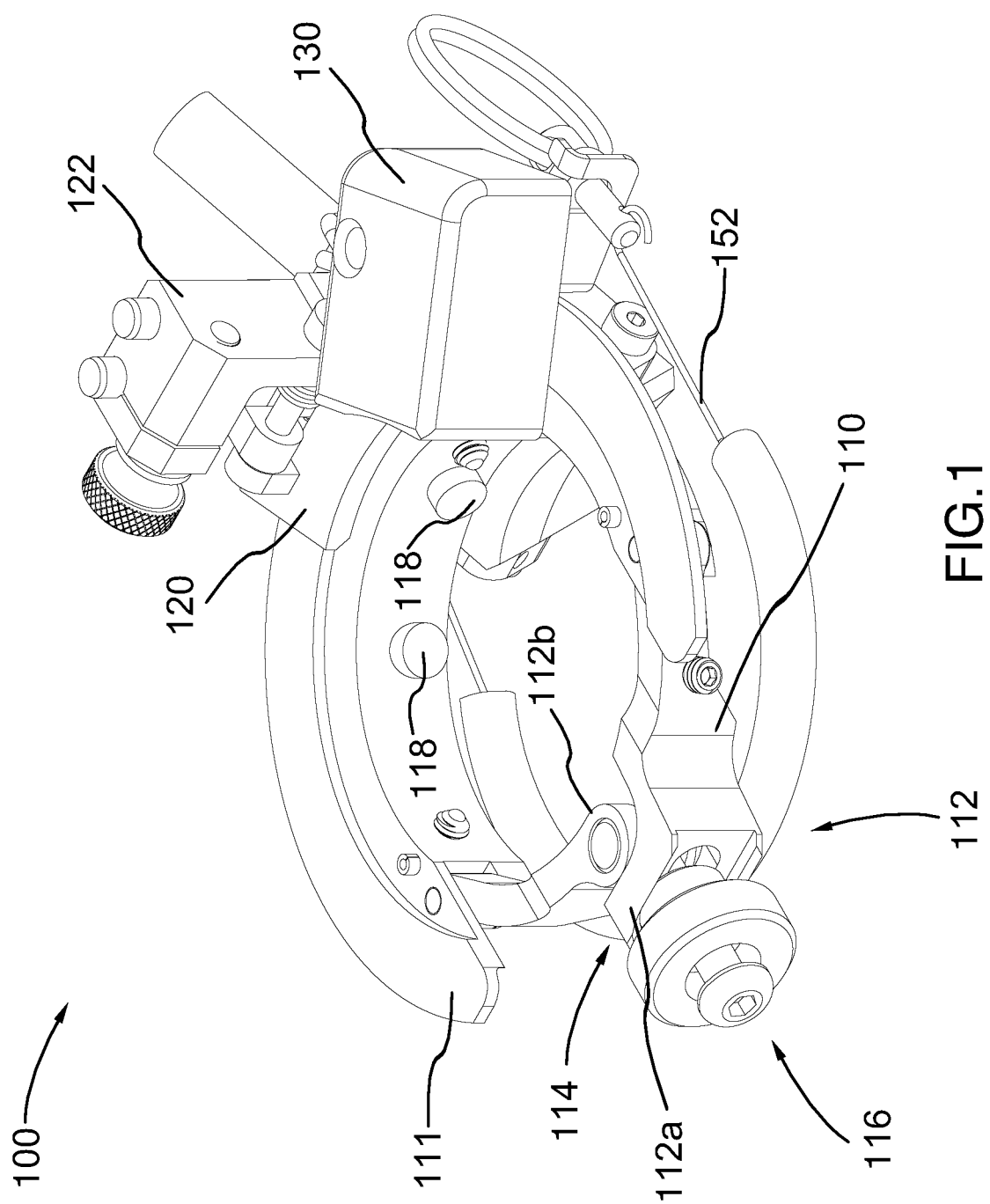
FIG. 1 is a perspective view of an ultrasonic device as disclosed herein.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the disclosed ultrasonic device, such as but not limited to "vertical," "horizontal," "upper," "lower," "above," or "below," refer to directions and relative positions with respect to the device's orientation in its normal intended operation, as indicated in the Figures herein. Thus, for instance, the terms "vertical" and "upper" refer to the vertical direction and relative upper position in the perspectives of the Figures and should be understood in that context, even with respect to an ultrasonic device that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 2:
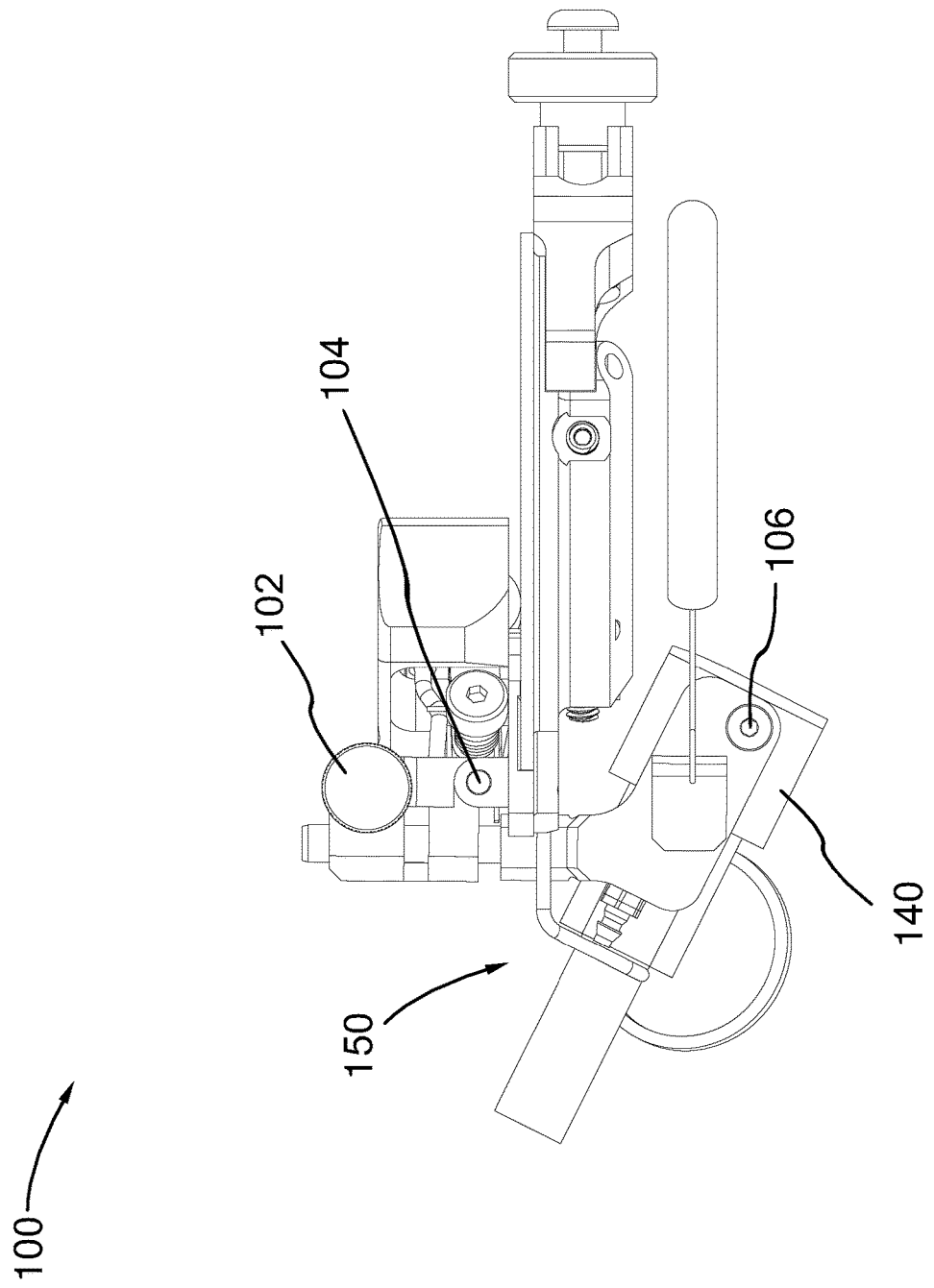
FIG. 2 is a side elevation view of the ultrasonic device illustrated in FIG. 1.
Figure 5:
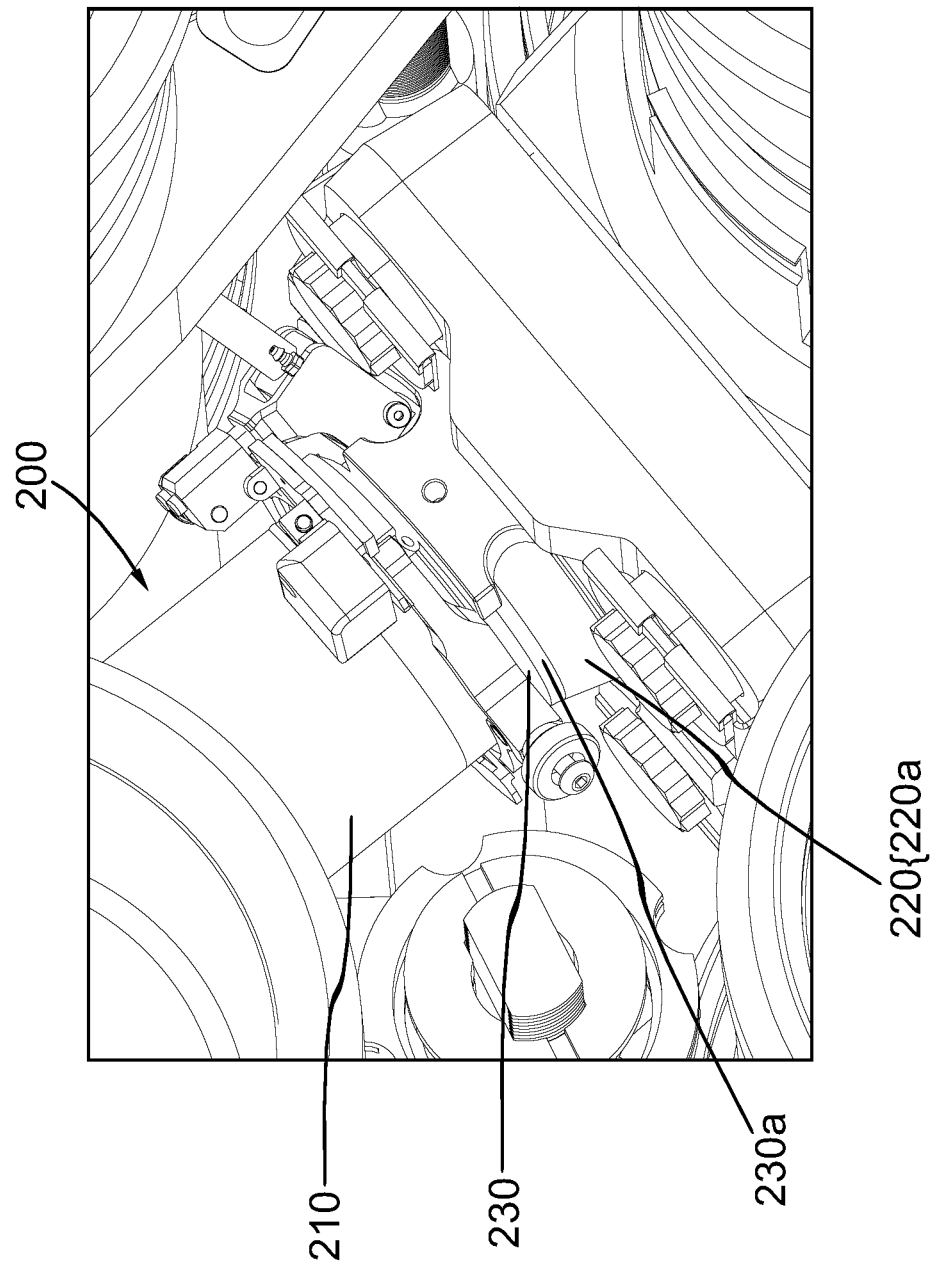
FIG. 5 is a perspective view of the ultrasonic device illustrated in FIGS. 1 to 3 clamped to a weld-joint of a Grayloc™ hub.
Figure 6:
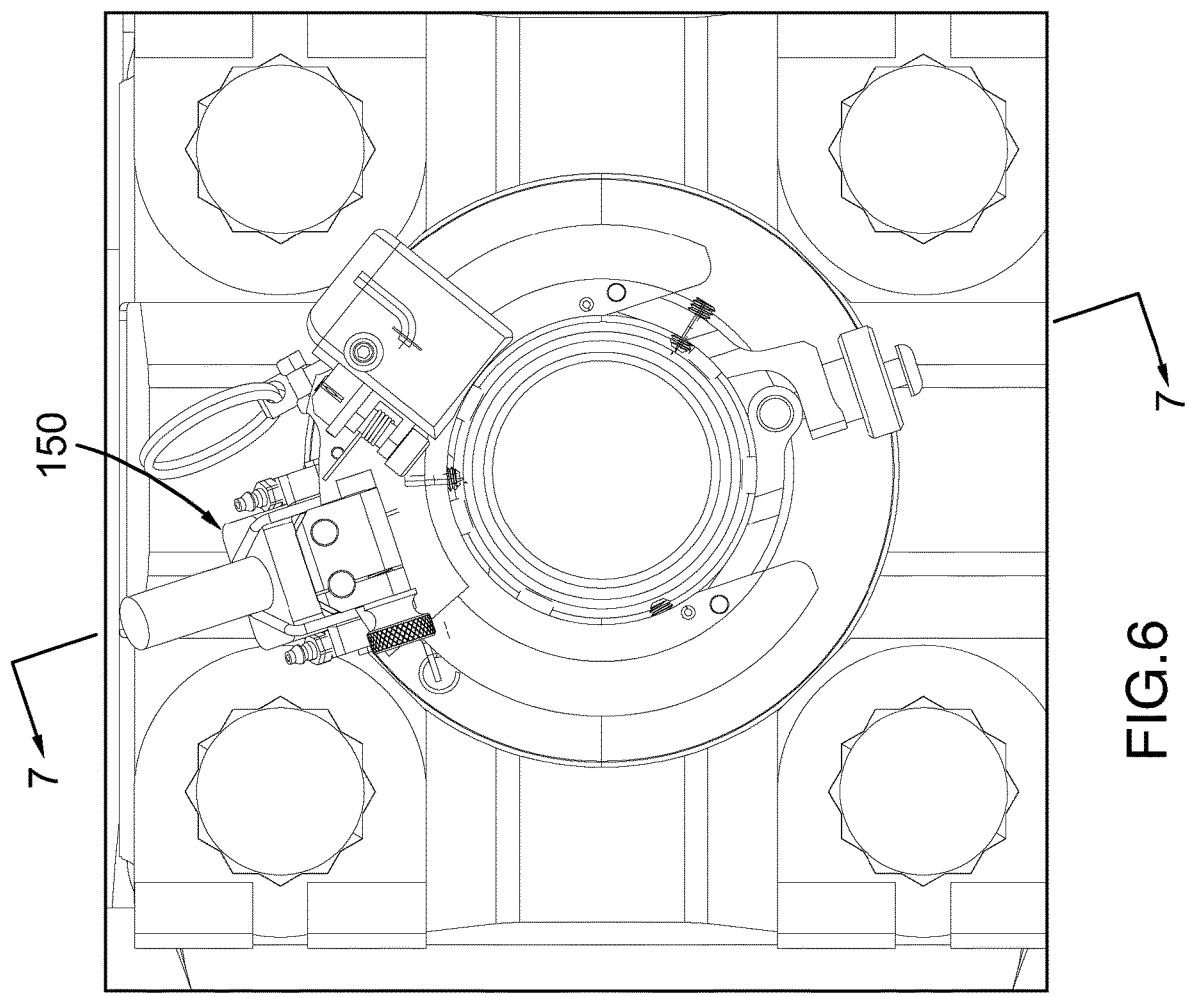
FIG. 6 is a top view of the ultrasonic device clamped to the Grayloc™ hub as illustrated in FIG. 5.
Figure 7:
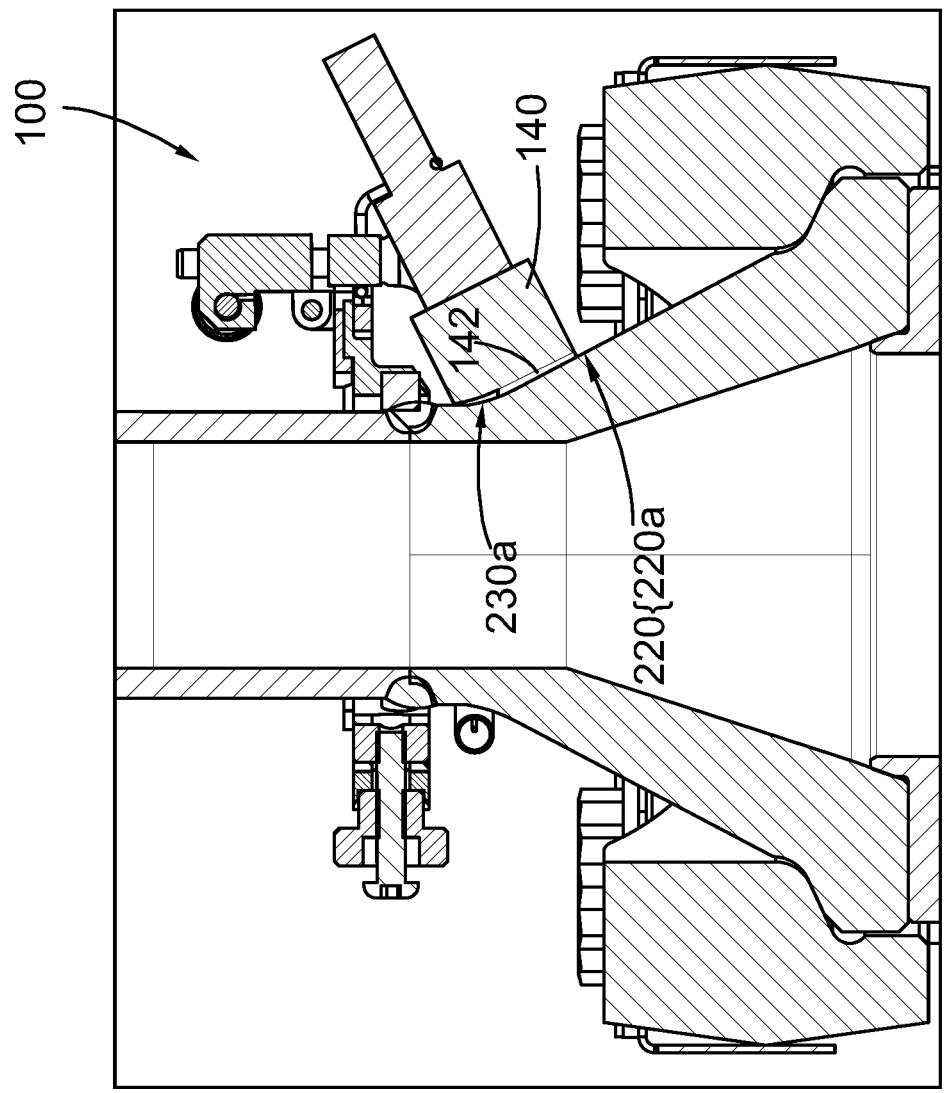
FIG. 7 a side-sectional elevation view of the ultrasonic device clamped to the Grayloc™ hub as illustrated in FIG. 6.

FIGS. 1 and 2 are an illustrative embodiment of an ultrasonic device for use in determining a minimum wall thickness of an object, such as the wall thickness of an object 200 further illustrated in FIGS. 5 through 7. The ultrasonic device 100 generally comprises a collar 110, a carriage 120, a position locator 130, and an ultrasonic probe unit 150 comprising a probe wedge 140. The collar 110 is designed to removably couple to the object 200, for positioning the probe wedge 140 and ultrasonic probe unit 150 proximal to a desired scanning location on the object 200. As illustrated in FIGS. 5 through 7 the example object 200 comprises a feeder pipe 210, a hub 220, and a weld-joint 230 made between the feeder pipe 210 and the hub 220. The hub 220 as particularly illustrated in FIGS. 5 through 7 is a Grayloc™ hub 220a, as may be used in a CANDU reactor.

As illustrated in FIG. 1, the collar 110 is a clamp-like collar, having a generally round shape and a clamping end 112. The clamping end 112 includes a clasping mechanism 114 for releasably connecting first and second collar ends 112a and 112b, and a locking mechanism 116 for locking the clasping mechanism 114. Accordingly, the collar 110 includes an open state where the ends 112a and 112b are detached from one another, and a closed stated where the ends 112a and 112b are clasped together. In an open state, an opening between the first and second collar ends 112a and 112b enables the collar 110 to wrap around an object 200. Subsequently, the first and second collar ends 112a and 112b may be clasped and locked together using the locking mechanism 116, thereby locking the collar 110 in a closed state around the object 200. Conversely, once the ultrasonic device 100 is attached to the object 200, the locking mechanism 116 may be released to unlock the clasping mechanism 114, and the collar ends 112a and 112b may be moved apart, opening the collar 110 for detaching the ultrasonic device 100 from the object 200. The collar 110 may further include a plurality of rubber pieces 118, for conforming a fit of the collar 110 to a surface of the object 200. For example, the collar 110 can mount conformingly to uneven surface topography, as may be present at a weld-joint, due to the resiliently compressible nature of rubber. In an embodiment, the rubber pieces 118 are formed of a resiliently compressible material.

The carriage 120 provides a platform for mounting and moving a position locator 130 and an ultrasonic probe unit 150 about the collar 110. A tightening mechanism 122 coupled to the carriage 120 may releasably secure the carriage 120 to a portion of the collar 110, such as an arcuate segment 111 of the collar 110. The carriage 120 is configured to move about the collar 110 for displacing the position locator 130, and the ultrasonic probe unit 150 therewith. In the illustrative embodiments of FIGS. 1 and 2, the carriage 120 is moveably mounted to an arcuate segment 111, such as a track, that spans part of a circumference of the collar 110. The carriage 120 moves about the arcuate segment 111, to position the position locator 130, and the ultrasonic probe unit 150 relative to the object 200.

The arcuate segment 111 illustrated in FIGS. 1 and 2 spans only a portion of a circumference of the collar 110, limiting the carriage 120 to displacing along a partial circumference of the collar 110. Consequently, inspecting an entire circumference of the object 200 using an embodiment of the ultrasonic device 100 as disclosed in FIGS. 1 and 2, may require completing multiple scans. For example, the collar 110 may clamp at a first radial position, for completing a first scan; followed by unclamping the collar 110 from the first radial position, rotating, and re-clamping the collar 110 to a second radial position, for completing a second scan. This process may be repeated as necessary to scan a full circumference of an object 200.

A position locator 130, such as an encoder, records position data as the carriage 120 displaces about the collar 110. In an embodiment, the position locator 130 records the carriage 110 in a zero position and records subsequent displacement of the carriage 110 relative to the zero position. Combining the position data recorded by the position locator 130 with thickness measurements made by the ultrasonic probe unit 150 localizes the thickness measurements on the object 200, and may be used to generate volumetric scan data.

The ultrasonic probe unit 150 comprises a probe wedge 140 having a contoured face 142 profiled to match a surface of the object 200. The contoured face promotes the probe wedge 140 to maintain conforming contact with a surface of the object 200, even when moving the carriage 110. In an embodiment, the probe wedge 140 comprises a hard plastic material. In an embodiment, the ultrasonic probe unit 150 may further comprise a spring 152 for exerting contact pressure between the probe wedge 140 and the object 200. For example, the spring 152 can wrap around the object 200 and further attach to the ultrasonic probe unit 150 to exert additional contact pressure between the probe wedge 140 and the object 200.

Figure 4:
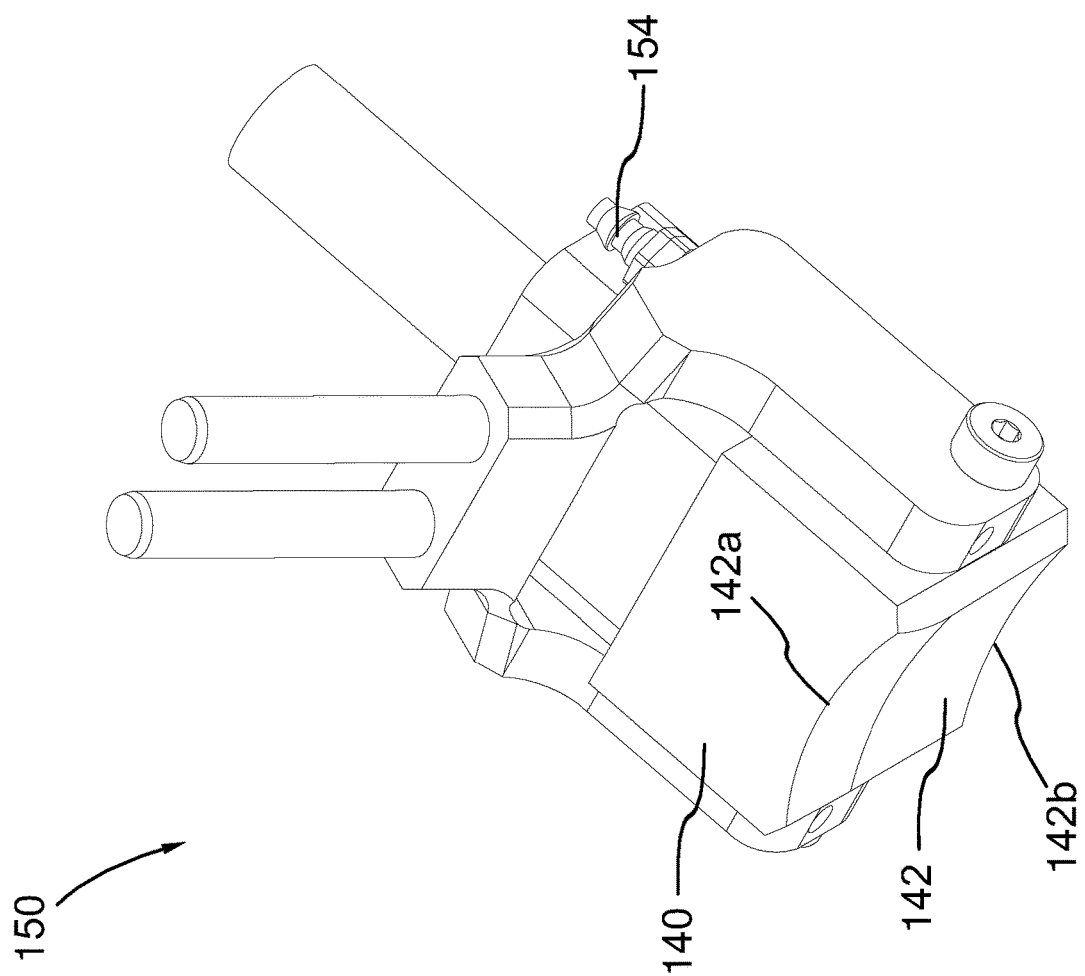
FIG. 4 is a perspective view of the ultrasonic probe unit illustrated in FIGS. 1 to 3.

As illustrated in FIG. 4, the contoured face 142 is curved and tapers from a top 142a to a bottom 142b of the contoured face 142. Such a contoured profile is particularly suitable for conforming to Grayloc™ hubs 220a, which have a tapered, cone shaped design. The contoured face 142 improves contact between the probe wedge 140 and object 200, allowing the probe wedge 140 to maintain conforming contact with the object 200 as it rotates around the object. Accordingly, as the carriage 120 displaces about the arcuate segment 111, the probe wedge 140 can maintain consistent, conforming contact with an object, such as maintaining contact with the hub 220 and the weld-joint edge 230a. Though the probe wedge 140 is illustrated as having a specific tapering on the contoured face 142 in the embodiments disclosed herein, those skilled in the art will appreciate that the contouring is designed to match a surface of an object to promote conforming contact between the probe wedge 140 and the object, and thus, other types of shapes, tapers, and contours can be used to conform the probe wedge to match a surface of the object.

Figure 3:
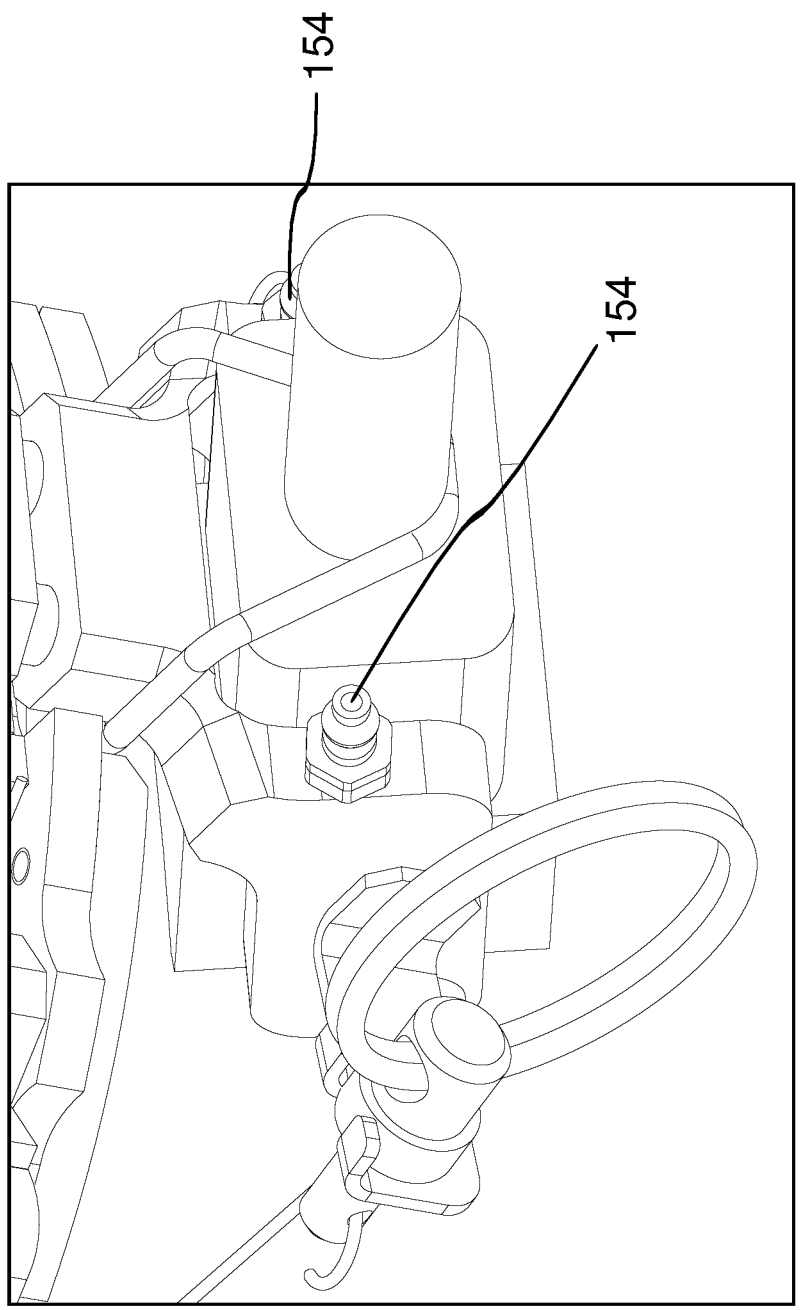
FIG. 3 is an enlarged perspective view of a rear portion of the ultrasonic device illustrated in FIGS. 1 and 2.

The ultrasonic probe unit 150 emits ultrasonic signals, for use in measuring a wall thickness of the object 200. The ultrasonic signals require a physical medium for transmission. The ultrasonic probe unit 150 emits the ultrasonic signals through the probe wedge 140, into the object 200. A couplant is provided on the surface of the probe wedge 140, for example on the contoured face 142, to bridge any gaps in contact that exists between the contoured face 142 and the object 200. Embodiments of a couplant include water, demineralized water, gels, and other ultrasonic couplants known in the art. As illustrated in FIGS. 3 and 4, the ultrasonic probe unit can include connectors 154 for receiving a couplant, for transmission to and dispersal on, the contoured surface 142. In this regard, the couplant can be housed in a storage unit or container external to the ultrasonic device 100, and further pumped into the ultrasonic device 100 through the connectors 154, for dispersal about the contoured face 142. In an embodiment, the ultrasonic device 100 is operated in a radioactive environment and the couplant is demineralized water.

A thickness of the object 200 may be determined based on propagation delay between emitting the ultrasonic signal and receiving an echo of the ultrasonic signal reflecting off an interior of the object 200. The thickness measurement may be further localized on the object 200 using position data recorded by the position locator 130. As disclosed herein, the ultrasonic probe unit 150 may pulse an ultrasonic signal through an adjacent probe wedge 140, for transmission into the object 200, at a contact point between the probe wedge 140 and the object 200. Poor contact or breaks in contact between the probe wedge 140 and the object 200, distort or otherwise prevent transmission of the ultrasonic signals between the probe wedge 140 and the object 200. A probe wedge 140 having a contoured face 142 as disclosed herein however, maintains tight conforming contact against the object 200, providing an optimal medium for uninterrupted transmission of an ultrasonic signal into the object 200. Furthermore, the ultrasonic probe unit 150 does not need to directly contact the object 200, as the probe wedge 140 instead contacts the object 200, thereby preventing contact wear on the ultrasonic probe unit 150.

As illustrated in FIGS. 5 through 7, the collar 110 is securely clamped at the weld-joint 230, positioning the probe wedge 140 and ultrasonic probe unit 150 proximal to a desired scanning location, such as the hub 220 or the weld-joint edge 230a. As further illustrated in FIG. 7, the probe wedge 140 comprises a contoured face 142, and is positioned to maintain conforming contact with the hub 220 and the weld-joint edge 230a, providing conforming contact points for transmitting the ultrasonic signal into the object 200. The ultrasonic signal transmits through the object 200 until reaching an end wall of the object 200, upon which an echo, or reflection of the ultrasonic signal, propagates back towards the ultrasonic probe unit 150. The ultrasonic probe unit 150 receives the ultrasonic signal reflection, for use in determining a wall thickness based on a propagation delay between transmitting the ultrasonic signal, and receiving the reflection. Thus, the ultrasonic probe unit 150 can pulse ultrasonic signals into the object 200, such as through the hub 220 or the weld-joint edge 230a, to determine a thickness of the object 200 at that location. The ultrasonic probe unit 150 may move relative to the probe wedge 140, and may adjust the ultrasonic signal to transmit at different incidence angles relative to the surface of the object 200. A true thickness of the object 200, at a given scanning location, may be identified when the ultrasonic signal reflects normal to a back wall of the object 200. In an embodiment, the ultrasonic probe unit 150 sweeps a plurality of incidence angles, to determine a true thickness of the object at a specific location on the object 200. Correlating the thickness measurements made by the ultrasonic probe unit 150 with position data recorded by the position locator 130, can further localize the thickness measurements on the object 200 and assist in generating volumetric scan data.

The ultrasonic probe unit 150 may scan the object 200 for a minimum wall thickness by measuring wall thicknesses at a plurality of locations on the object 200. Position data recorded by the position locator 130 may localize the wall thickness measurements, and may be further used to generate a volumetric scan of the object 200. Analyzing the wall thickness measurements and/or volumetric scan data can identify a minimum wall thickness, for use in assessing the mechanical fitness of the object 200. For example, moving the carriage 120 along the arcuate segment 111 radially positions the probe wedge 140 and the ultrasonic probe unit 150 about the object 200. As the carriage 110 moves along the arcuate segment 111, the probe wedge 140 maintains conforming contact with the object 200 and the ultrasonic probe unit 150 collects and records wall thickness measurements at different radial positions along the object 200. Similarly, as the carriage 110 moves, the position locator 130 collects and records corresponding position data, for localizing the wall thickness measurements on the object 200. In this manner, the ultrasonic probe unit 150 scans the object 200 as the carriage 110 moves along the arcuate segment 111. As particularly illustrated in FIGS. 5 through 7, the probe wedge 140 and the ultrasonic probe unit 150 are positioned to scan a wall thickness along the hub 220 and the weld-joint edge 230a.

As the arcuate segment 111 does not fully span a circumference of the collar 110, the ultrasonic probe unit 150 is consequently limited to scanning a partial circumference of the object 200. For example, the collar 110 may be clamped at a first radial position on the object 200, for completing a first scan spanning the arcuate segment 111, followed by unclamping the collar 110 from the first radial position, rotating, and reclamping the collar 110 to a second radial position on the object 200, for completing a second scan along the arcuate segment 111. This process can be repeated as necessary to generate a plurality of scans that span a circumference of the object 200. Similarly, the collar 110 can clamp at different locations along a vertical axis of the object 200, for completing radial scans at different vertical elevations along the object 200.

In an embodiment, the ultrasonic device 100 may include a plurality of mechanisms for adjusting a height, angle, orientation, or other position characteristic of the ultrasonic probe unit 150 and probe wedge 140. For example, a thumb screw 102 can be used to lock a position of the probe unit 150 along a first axis; the probe unit 150 can further pivot about a first rotational axis 104; and the probe wedge can pivot about a second rotational axis 106. In this manner, a position, angle, and orientation of the ultrasonic probe unit 150 and probe wedge 140 can be adjusted, and further change the incidence angle of the ultrasonic signal transmitted from the probe wedge 140 into the object 200. Accordingly, by adjusting the position, angle, and/or orientation, the ultrasonic device 100 can sweep a plurality of incidence angles for use in determining a true wall thickness.

In an embodiment, the ultrasonic probe unit 150 comprises a phase array ultrasonic probe, for generating the ultrasonic signal. The phased array ultrasonic probe may comprise a plurality of ultrasonic elements, each generating a corresponding ultrasonic pulse, the plurality of ultrasonic pulses for forming the ultrasonic signal. The plurality of ultrasonic pulses can be controlled using principles of beam steering to modify an incidence angle of the ultrasonic signal.

Increasing the number of ultrasonic elements increases the ultrasonic probe unit 150 form factor size while also increasing the measurement resolution of the ultrasonic probe unit 150. Similarly, decreasing the number of ultrasonic elements decreases the ultrasonic probe unit form factor size while also decreasing the measurement resolution of the ultrasonic probe unit 150. Accordingly, selecting a number of ultrasonic elements is a trade-off between performance and size. In use, an ultrasonic device 100 as disclosed herein has been found to provide accurate wall thickness measurements using as few as sixteen ultrasonic elements; and, an ultrasonic device as disclosed herein has been found to maintain a suitably small form factor using as many as thirty-two ultrasonic elements. Those skilled in the art will appreciate however, that a different number of ultrasonic elements may be used to provide an appropriate level of measurement resolution while also maintaining a suitably small enough form factor for operation in a space restricted environment, as may be the case when inspecting feeder-weld hubs in a CANDU reactor.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof. The scope of the claims should not be limited by the particular embodiments set forth herein, but should be construed in a manner consistent with the specification as a whole.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. An ultrasonic device for scanning an object, the device comprising:
   a collar configured for coupling to the object, the collar having an arcuate segment;
   a carriage coupled to the collar, the carriage configured for displacement along the arcuate segment;
   an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object; and
   a position locator coupled to the carriage, the position locator configured to record a position of the ultrasonic probe unit,
   wherein the ultrasonic probe unit emits the ultrasonic beam at an incidence angle relative to the object,
   further wherein the ultrasonic probe unit is configured to adjust the incidence angle using beam steering and the incidence angle is selected for reflecting the ultrasonic beam substantially normal to a back surface of the object.

2. The ultrasonic device of claim 1, wherein the ultrasonic probe unit receives an ultrasonic couplant for dispersal on to the contoured face of the wedge.

3. The ultrasonic device of claim 2, wherein the position of the ultrasonic probe unit is adjustable.

4. The ultrasonic device of claim 1, wherein the ultrasonic probe unit comprises a phased array ultrasonic probe configured to emit the ultrasonic beam.

5. The ultrasonic device of claim 4 wherein the phased array ultrasonic probe comprises a plurality of ultrasonic elements configured to generate the ultrasonic beam.

6. The ultrasonic device of claim 5, wherein the phase array ultrasonic probe comprises at least 16 ultrasonic elements and no more than 32 ultrasonic elements.

7. The ultrasonic device of claim 6, further comprising a biasing element coupled to the ultrasonic probe unit, the biasing element configured to exert contact pressure between the wedge and the object.

8. The ultrasonic device of claim 7, wherein the biasing element is a spring.

9. An ultrasonic device for scanning an object, the device comprising:
- a collar configured for coupling to the object, the collar having an arcuate segment;
- a carriage coupled to the collar, the carriage configured for displacement along the arcuate segment;
- an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object;
- a position locator coupled to the carriage, the position locator configured to record a position of the ultrasonic probe unit; and
- wherein the arcuate segment spans between 180 degrees and less than 220 degrees, of a circumference of the collar,
- wherein the ultrasonic probe unit comprises a phased array ultrasonic probe configured to emit the ultrasonic beam,
- further wherein the ultrasonic probe unit is configured to adjust an incidence angle using beam steering and the incidence angle is selected for reflecting the ultrasonic beam substantially normal to a back surface of the object.

10. The ultrasonic device of claim 9, wherein the ultrasonic probe unit receives an ultrasonic couplant for dispersal on to the contoured face of the wedge.

11. The ultrasonic device of claim 9, further comprising a biasing element coupled to the ultrasonic probe unit, the biasing element configured to exert contact pressure between the wedge and the object.

12. The ultrasonic device of claim 11, wherein the biasing element is a spring.

13. The ultrasonic device of claim 9, wherein the phased array ultrasonic probe comprises a plurality of ultrasonic elements configured to generate the ultrasonic beam.

14. The ultrasonic device of claim 13, wherein the phase array ultrasonic probe comprises at least 16 ultrasonic elements and no more than 32 ultrasonic elements.

15. The ultrasonic device of claim 9, wherein the position of the ultrasonic probe unit is adjustable.

16. An ultrasonic device for scanning an object, the device comprising:
- a collar configured for coupling to the object, the collar having an arcuate segment;
- a carriage coupled to the collar, the carriage configured for displacement along the arcuate segment;
- an ultrasonic probe unit coupled to the collar and comprising a wedge having a contoured face configured for maintaining conforming contact against a surface of the object, the ultrasonic probe unit configured to emit an ultrasonic beam for transmission through the contoured face of the wedge and into the object;
- a position locator coupled to the carriage, the position locator configured to record a position of the ultrasonic probe unit; and
- wherein the collar further comprises a plurality of resiliently compressible elements for providing conforming contact between the collar and the object,
- wherein the ultrasonic probe unit comprises a phased array ultrasonic probe configured to emit the ultrasonic beam,
- further wherein the ultrasonic probe unit is configured to adjust an incidence angle using beam steering and the incidence angle is selected for reflecting the ultrasonic beam substantially normal to a back surface of the object.

17. The ultrasonic device of claim 16, wherein the collar is a clamp configured to releasably attach to the object.

18. The ultrasonic device of claim 16, wherein the phased array ultrasonic probe comprises a plurality of ultrasonic elements configured to generate the ultrasonic beam.

19. The ultrasonic device of claim 18, wherein the phase array ultrasonic probe comprises at least 16 ultrasonic elements and no more than 32 ultrasonic elements.

20. The ultrasonic device of claim 16, further comprising a biasing element coupled to the ultrasonic probe unit, the biasing element configured to exert contact pressure between the wedge and the object.

\* \* \* \* \*